United States Patent [19]

Parra

[11] Patent Number: 5,134,592
[45] Date of Patent: Jul. 28, 1992

[54] METHOD AND APPARATUS FOR SEPARATING DOLPHIN FROM TUNA

[76] Inventor: Jorge M. Parra, 7332 Grand Blvd., New Port Richey, Fla. 34652

[21] Appl. No.: 633,539

[22] Filed: Dec. 28, 1990

[51] Int. Cl.⁵ .................. H04B 1/02; A01K 79/02
[52] U.S. Cl. ............................. 367/139; 43/9.2; 43/17.1
[58] Field of Search ............... 43/9.2, 17.1; 367/139, 367/140, 141; 340/384 E

[56] References Cited

U.S. PATENT DOCUMENTS

| | | |
|---|---|---|
| 2,709,984 | 6/1955 | Marks . |
| 2,745,205 | 5/1956 | Kafka . |
| 2,808,674 | 10/1957 | Vang . |
| 2,850,833 | 9/1958 | Kreutzer . |
| 3,005,280 | 10/1961 | Vang . |
| 3,164,772 | 1/1965 | Hicks IV . |
| 3,317,889 | 5/1967 | Barrand .......................... 43/17.1 |
| 3,414,873 | 12/1968 | Richard et al. . |
| 3,524,276 | 8/1970 | Thomas et al. ................. 43/17.1 |
| 3,683,280 | 8/1972 | Holt ................................ 43/17.1 |
| 3,849,927 | 11/1974 | Consalves . |
| 3,859,954 | 1/1975 | Pauletich . |
| 3,886,492 | 5/1975 | White .............................. 367/139 |
| 4,105,992 | 8/1978 | Luciano .......................... 367/139 |
| 4,646,276 | 2/1987 | Kowalewski et al. .......... 367/139 |
| 4,922,468 | 5/1990 | Menezes . |
| 4,965,552 | 10/1990 | Price et al. . |

FOREIGN PATENT DOCUMENTS

SU488570  6/1978  U.S.S.R. ............................. 43/17.1

Primary Examiner—Richard K. Seidel
Assistant Examiner—Chuck Y. Mah
Attorney, Agent, or Firm—Jim Zegeer

[57] ABSTRACT

A method and apparatus for using the primordial fear of dolphin of killer whales to separate dolphin from tuna. The sound of killer whale is recorded, digitized, edited and enhanced to produce digitally synthesized killer whale sounds. These digitally synthesized sounds of one or more feeding killer whale is played under water and in the vicinity of a mixed school of dolphin and tuna and as the dolphin leave said vicinity, catching the tuna in nets. A playback unit is selectively triggered on and off from a remote location.

5 Claims, 1 Drawing Sheet

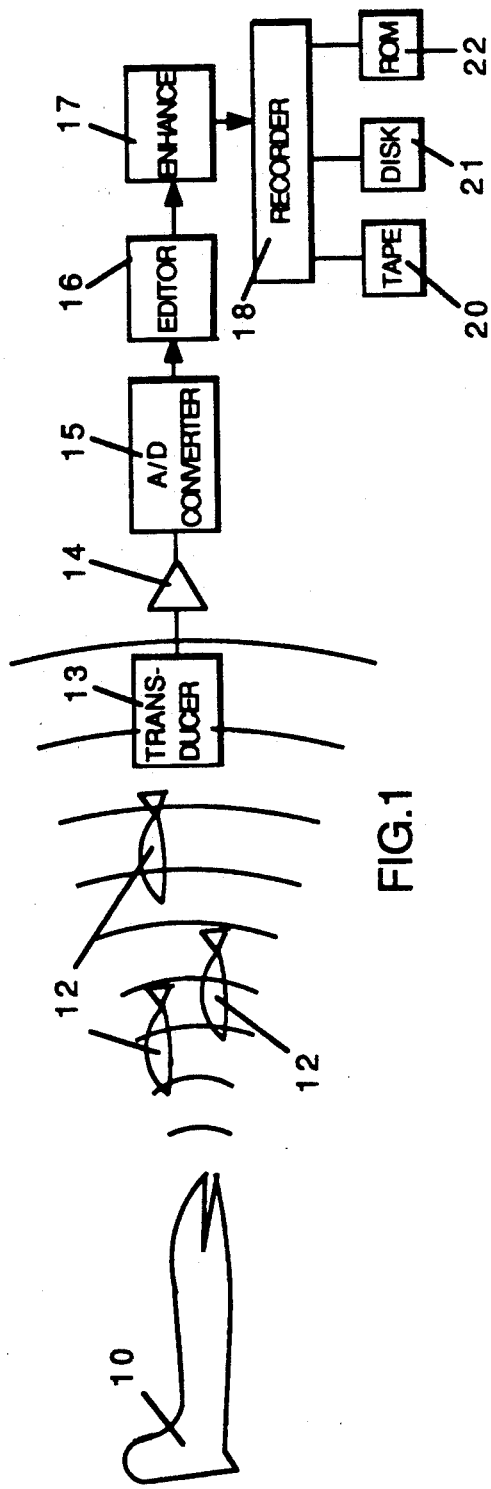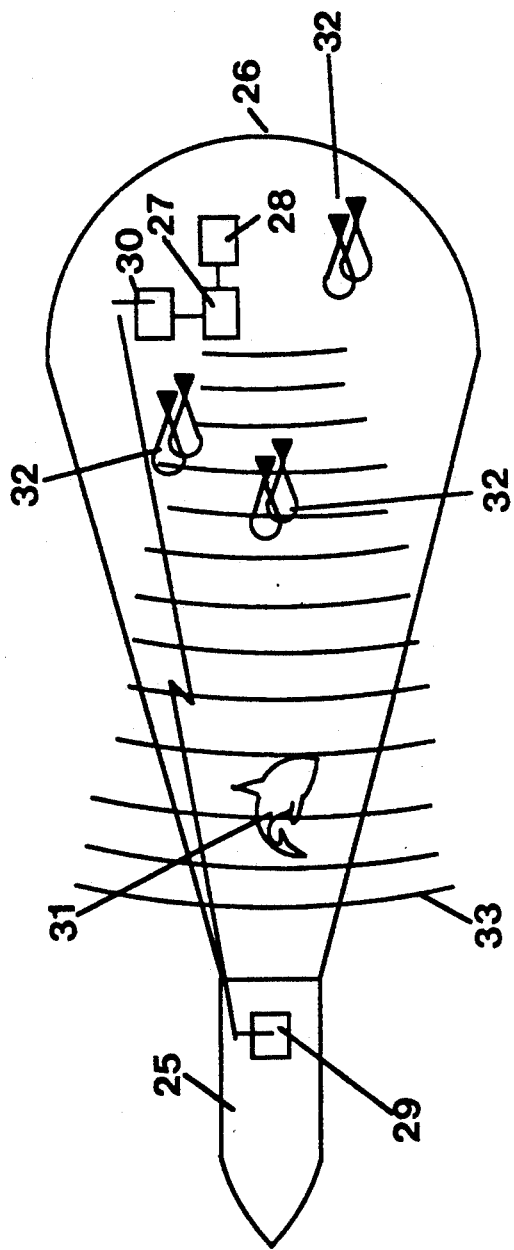

METHOD AND APPARATUS FOR SEPARATING DOLPHIN FROM TUNA

The present invention relates to a method and apparatus for separating certain aquatic mammals from fish such as tuna and the like.

BACKGROUND AND BRIEF DESCRIPTION OF THE INVENTION

In the past, there have been several techniques attempted to be utilized by commercial tuna fishermen to separate dolphin from tuna. Tuna fishermen in small boats in advance of the nets have attempted to chase the dolphin away from the nets and this technique has resulted in the injury and possible loss of life to tuna fishermen and still results in some dolphin being caught in tuna nets. Others have attempted explosions in the water to frighten the dolphin.

The present invention utilizes the primordial fear of dolphin to killer whale to separate dolphin from tuna. This permits the tuna may be caught in tuna nets without the dolphin being captured in the tuna net. According to the invention, the sound of one or more killer whale feeding is captured by a transducer, converted to digital sound and then edited to edit out splashing sounds or other non-useful portions of the recording. In addition, the killer whale feeding sounds are enhanced by producing more of them and, when such killer whales are in a feeding frenzy, the sounds are recorded digitized, edited and enhanced and then broadcast in the sea water by a high power acoustic transducer to simulate the feeding frenzy.

In the preferred embodiment, these enhanced feeding sounds of killer whales are digitally stored and reproduced in an underwater transducer. The transducer (there may be a plurality of spaced transducers to simulate more than one killer whale) is positioned ahead of a net which is being used to capture the tuna. In another embodiment, the transducer(s) is located between the net and the ship towing the net. Preferably, the transducer is located along the travel axis or path of the ship and the net.

DETAILED DESCRIPTION OF THE DRAWINGS

The above and other objects, advantages and features of the invention will become more apparent when considered with the following specification and accompanying drawings wherein:

FIG. 1 is a block diagram illustrating the capturing of the killer whale sounds; digitization thereof, editing and enhancement and recording, and FIG. 2 illustrates a position of the transducers for converting the digitally recorded killer whale feeding sounds to acoustic energy for coupling into the salt water between the ship and the tuna nets and frighten the dolphin away from the tuna.

DETAILED DESCRIPTION OF THE INVENTION

It is known that aquatic mammals living in the sea have over the millennium developed a primordial fear of predator aquatic animals and that fish, such as tuna, which have no memory and thus have not developed the same primordial fear that mammals have developed. Thus, while tuna may have certain immediate fear of being eaten by a killer whale, for example, it's not as strong as those senses developed in the and the like have similarly developed primordial fears of the feeding sound of killer whales, which is a sea predator that is capable of generating these sounds that generate the primordial fear in this higher order of aquatic animals. The present invention seeks to synthesize the feeding sounds of predator aquatic animals such as the killer whale and use the synthesized to separate tuna from dolphin. In other cases, this inducing of this primordial fear in aquatic animals that are desired to be protected can induce them to shy away from danger areas and thus by locating a transducer for introducing the feeding sounds of predator aquatic animals at danger areas, causes them to travel away.

Referring to FIG. 1, a killer whale 10 is generating killer whale feeding sounds which are indicated by pressure waves 11 as the killer whale is feeding on fish 12. These soundwaves are picked-up by transducer 13 which is a broadband transducer picking-up both infrasonic sounds as well as high frequency sounds over a wide spectrum and the soundwaves are converted to electrical signals transmitted to an amplifier 14 and converted to a digital signal by analog-to-digital converter 15. This provides a digital rendition of the killer whale feeding sounds which is edited in editor 16 to delete splashing sounds, and other non-useful portions of the digitized audio signal. The edited digital signals of the killer whale feeding sounds are then enhanced in enhancing module 17. Enhancement may take the form of making the sounds more forceful by repeating them at a higher rate (while maintaining the same sound frequency spectrum). During this phase of the process of producing the synthesized killer whale feeding sounds, testing may be done by playing the sounds in pools where captured dolphin, such as bottle-nosed dolphins are located, and by modifying the repetition rate as well as the energy levels it is possible to make the killer whale feeding sounds more forceful and thus have more of an effect on the dolphin in inducing the primordial fear in the dolphin of the killer whale. After the digital signals of the killer whale feeding sounds have been enhanced in enhancer 17, a record thereof is made in recorder 18 such as on a tape 20, a disk 21 (magnetic or optical) or in an electronic chip 22 such as a LSI ROM memory.

Referring now to FIG. 2, a tuna ship 25 tows one or more net 26 and has a number of smaller ships or boats (not shown) which tend tuna nets 26. Positioned between the ship 25 and tuna net 26 are one or more transducers 27 which are connected to a playback unit 28 and have one of the records 20, 21, 22 therein for driving the transducer 27. Transducer 27, preferably is omni-directional but may be directional, and the playback unit 28 may be selectively triggered on and off by a radio signal from a transmitter 29 on the ship and received by a receiver 30. Receiver 30 triggers on the playback unit 28 on and off to selectively playback the recorded killer whale sounds which are amplified and applied to transducer 27 to thereby broadcast into the sea water the killer whale sounds.

This causes the dolphin 31 which may be swimming in a mixed school of tuna 32 or slightly above or below the tuna to separate quickly from the tuna and thereby permit the tuna to be captured in the nets 26 free or substantially free of all dolphin.

While there has been shown and described a preferred embodiment of the invention, it will be appreciated that other embodiments will be readily apparent to those skilled in the art and it is desired to encompass such obvious modification and variations within the spirit and scope of the claims appended hereto.

What is claimed is:

1. Tuna fishing apparatus including means for separating dolphin from tuna comprising broadband transducer means for receiving both infrasonic as well as high frequency killer whale feeding sounds and producing first signal means for producing a digitally synthesized second signal corresponding to that of said feeding killer whale and said first signal, means for editting-out splashing and other non-useful portions of said digitally synthesized signal to produce edited killer whale signals, means for enhancing the edited killer whale signals, and means for digitally recording the edited and enhanced digitally synthesized signals of feeding killer whales.

2. The tuna fishing apparatus defined in claim 1 including playback means for playing said digitally synthesized signal corresponding to feeding killer whales and a transducer immersed in the water for acoustically broadcasting said digitally synthesized signals in the water.

3. The tuna fishing apparatus defined in claim 1 including means for selectively turning said playback means on and off.

4. The tuna fishing apparatus defined in claim 1 wherein said transducer means is omni-directional.

5. The tuna fishing apparatus defined in claim 1 wherein said transducer means is directional.

* * * * *